United States Patent
Dolev et al.

(10) Patent No.: US 11,106,601 B2
(45) Date of Patent: Aug. 31, 2021

(54) METHOD AND SYSTEM FOR PERFORMING ADAPTIVE CACHE MANAGEMENT

(71) Applicant: B. G. NEGEV TECHNOLOGIES AND APPLICATIONS LTD., AT BEN-GURION UNIVERSITY, Beer Sheva (IL)

(72) Inventors: Shlomi Dolev, Omer (IL); Daniel Berend, Beer-Sheva (IL); Marina Kogan-Sadetsky, Kfar-Sava (IL)

(73) Assignee: B. G. NEGEV TECHNOLOGIES AND APPLICATIONS LTD., AT BEN-GURION UNIVERSITY, Beer Sheva (IL)

( * ) Notice: Subject to any disclaimer, the term of this patent is extended or adjusted under 35 U.S.C. 154(b) by 117 days.

(21) Appl. No.: 16/729,695

(22) Filed: Dec. 30, 2019

(65) Prior Publication Data
US 2020/0210349 A1     Jul. 2, 2020

Related U.S. Application Data

(60) Provisional application No. 62/786,560, filed on Dec. 31, 2018.

(51) Int. Cl.
*G06F 12/126*     (2016.01)
(52) U.S. Cl.
CPC .... *G06F 12/126* (2013.01); *G06F 2212/1021* (2013.01)
(58) Field of Classification Search
None
See application file for complete search history.

(56) References Cited

U.S. PATENT DOCUMENTS 6,738,865 B1 *   5/2004   Burton .................. G06F 12/122
                                                        711/133
2012/0272010 A1 * 10/2012   Larkby-Lahet ..... G06F 12/0888
                                                        711/136

(Continued)

OTHER PUBLICATIONS

K. Cheng and Y. Kambayashi; "LRU-SP: a size-adjusted and popularity-aware LRU replacement algorithm for web caching", 24th Annual International Computer Software and Applications Conference, COMPSAC 2000, pp. 48-53 (6 pages).

(Continued)

*Primary Examiner* — William E. Baughman
(74) *Attorney, Agent, or Firm* — Roach Brown McCarthy & Gruber, P.C.; Kevin D. McCarthy

(57) ABSTRACT

A method for efficiently method for performing adaptive management of a cache with predetermined size and number of cells with different locations with respect to the top or bottom of the cache, for storing at different cells, data items to be retrieved upon request from a processor. A stream of requests for items, each of which has a temporal probability to be requested is received and the jump size is incremented on cache misses and decremented on cache hits by automatically choosing a smaller jump size and using a larger jump size when the probability of items to be requested is changed. The jump size represents the number of cells by which a current request is promoted in the cache, on its way from the bottom, in case of a cache hit, or from the outside in case of a cache miss, towards the top cell of the cache.

12 Claims, 3 Drawing Sheets

(56) References Cited

U.S. PATENT DOCUMENTS

| | | | | |
|---|---|---|---|---|
| 2014/0089613 | A1* | 3/2014 | Kramer | G06F 12/122 711/160 |
| 2014/0237193 | A1* | 8/2014 | Shivashankaraiah | G06F 12/123 711/136 |
| 2016/0371193 | A1* | 12/2016 | Floratou | G06F 12/0888 |
| 2018/0052778 | A1* | 2/2018 | Kalamatianos | G06F 12/0811 |
| 2019/0129970 | A1* | 5/2019 | Armangau | G06F 16/1748 |
| 2020/0026663 | A1* | 1/2020 | Xu | G06F 12/122 |

OTHER PUBLICATIONS

D. Starobinski and D. Tse, "Probabilistic Methods for Web Caching," Performance Evaluation, 2001, pp. 125-137 (13 pages).

H. Dybdahl, P. Stenstrom, and L. Natvig. "An LRU-based Replacement Algorithm Augmented with Frequency of Access in Shared Chip-Multiprocessor Caches." In Proceedings of the 6th Workshop on Memory Performance: Dealing with Applications, Systems and Architecture (MEDEA 2006), 2006 (8 pages).

A. Vakali, 2000. "LRU-based algorithms for Web cache replacement", In International Conference on Electronic Commerce and Web Technologies. Lecture Notes in Computer Science, vol. 1875. Springer-Verlag, Berlin, Germany, pp. 409-418. (10 pages).

W. A. Wong and J.-L. Baer. "Modified LRU policies for improving second-level cache behavior", In HPCA-6, 2000 (12 pages).

E. B. Dynkin, "Theory of Markov Processes", Pergamon, 1960 (1 page).

E. J. O'Neil, P. E. O'Neil, G. Weikum, "The LRU-k Page Replacement Algorithm for Database Disk Buering", Proc. ACM SIGMOD Conf., 1993, pp. 297-306 (10 pages).

J. Li, S. Shakkottai, J. C. S. Lui, and V. Subramanian, "Accurate Learning or Fast Mixing? Dynamic Adaptability of Caching Algorithms," Arxiv preprint arXiv:1701.02214, 2017 (15 pages).

H. M. Taylor and S. Karlin, "An Introduction to Stochastic Modeling", San Diego: Academic Press, 3rd ed., 1998 (646 pages).

N. Gast and B. Van Houdt, "Asymptotically Exact TTL-Approximations of the Cache Replacement Algorithms LRU(m) and h-LRU," in Proc. of ITC, 2016 (15 pages).

V. Martina, M. Garetto, and E. Leonardi, "A Unified Approach to the Performance Analysis of Caching Systems," in Proc. of INFOCOM, 2014 (16 pages).

N. Megiddo and D. S. Modha, "ARC: A Self-Tuning, Low Overhead Replacement Cache." in Proc. of FAST, 2003 (17 pages).

\* cited by examiner

METHOD AND SYSTEM FOR PERFORMING ADAPTIVE CACHE MANAGEMENT

FIELD OF THE INVENTION

The present invention relates to the field of cache management. More particularly, the invention relates to a method and system for performing adaptive cache management using a unique scheduling algorithm.

BACKGROUND OF THE INVENTION

A cache is a high speed memory that temporarily saves data and content from a website, for example, so that the next time the site is visited, that content can be displayed much faster. The cache helps a web page load much faster for a better user experience. When data and content gets stored into a cache memory, it is referred to as "caching."

Cache performance can be evaluated by cache hits and cache misses and hit and miss ratios, as well as miss penalties. A cache hit refers to the situation wherein the cache is able to successfully retrieve data and content that was saved to it, and then display it on a web page. A cache miss occurs in the opposite situation. The site requests the content from the cache, but after searching for it, the cache determines that content wasn't saved. That is when the cache saves the content so it is available the next time it is requested.

When a cache miss occurs, it takes up extra time and server resources which ends up slowing down the page speed load times. The more cache miss happens, the worse it is for the server's resources, and page load times. The delay that occurs in a page load times due to cache misses are known as miss penalties.

A hit ratio is a calculation of cache hits, and comparing them with how many total content requests were received. A miss ratio is the flip side of this, where the cache misses are calculated and compared with the total number of content requests that were received. Hit and miss ratios are significant because they can provide indications of how well the cache is performing, and if its performance is optimized. A high hit ratio and low miss ratio means that the cache is operating well. It also means that content is likely being retrieved from the cache quickly, and page load times are also as fast as possible for end users.

If the cache's miss ratio is high, and the hit ratio is low, then your cache is not running optimally, and the users are see slower page load times than they should be seeing. The situation of a high miss ratio may be improved, for example, by expanding the cache since the larger it is, the more data it can hold, and the less cache misses will occur.

A hit ratio is calculated by dividing the number of cache hits with the sum of the number of cache hits, and the number of cache misses. If the hit ratio is known, then the miss ratio is known, because the hit and miss ratios equal to one. Therefore, it is desired that the cache will store those data items that are most frequently accessed.

There are two well-known self-organizing cache management algorithms available to keep the cache in near-optimal order without resorting to counters: Least Recently Used (LRU) and CLIMB.

Least Recently Used (LRU) Algorithm:

The most well-known is LRU, which, upon a request for a page (or item) not stored in the cache, replaces the least recently used item.

Upon receiving a request for some item j, which is not in the cache (i.e., a cache miss), this item is inserted in the first position in the cache, all other items in the cache move down one position, and the item at the last position is evicted. If j is in the cache (i.e., a cache hit), for example, at position i, then it moves to the first position, while all items at positions 1 to i−1 move down by one position.

CLIMB Algorithm:

The CLIMB algorithm views the cache memory as a stack. Each time a page (or an item) is requested, it is exchanged with the immediately preceding page (or item); if the requested page is at the head of the stack nothing is done. Upon receiving a request for a page (or item) not stored in the cache, CLIMB replaces the item positioned at the bottom of the stack.

Upon receiving a request for item j, which is not in the cache, this item is placed in the last position in the cache, and the item at that position is evicted; when a cache hit occurs on an item at position i, this item exchanges places with the item at position i−1 (unless i=1, in which case there is no change).

LRU is known to be fast in adapting to changes in the distribution [5]. CLIMB has been experimentally shown to have a higher hit ratio than LRU during periods of stable distribution [7]. The reason is that CLIMB tends to keep the heavy hitters at top positions in the cache, and hence there is a smaller probability of them being evicted. However, CLIMB algorithm requires increased time to reach a steady state in comparison to LRU [7].

If N be the number of possible requests, K the cache size, and $p_j$, $1 \leq j \leq N$, the probability of each item j to be requested at each step, then under the Independent Requests (IR) model, the steady-state probabilities $\pi(\vec{\sigma})$ of each cache configuration $\vec{\sigma} = (\sigma_1, \sigma_2, \ldots, \sigma_K)$ are known for both algorithms [1]:

$$\pi^{LRU}(\vec{\sigma}) = \prod_{i=1}^{K} \frac{p_{\sigma_i}}{1 - \sum_{r=1}^{i-1} p_{\sigma_r}},$$

$$\pi^{CLIMB}(\vec{\sigma}) = C_1 \cdot \prod_{i=1}^{K} p_{\sigma_i}^{K-i+1},$$

where $C_1$ is a normalization constant. Although CLIMB has been shown experimentally to have a higher hit ratio than LRU under stable conditions, there is as yet no rigorous proof of this fact [1].

Both algorithms manage the order of the items in the cache by placing items that are believed to be heavy hitters, at the top of the cache, and move less heavy hitters closer to the bottom. The dynamics of the LRU and CLIMB algorithms can both described by an ergodic Markov chain.

Caching algorithms attempt to ensure content availability by trying to learn the distribution of content requests in some manner. Usually, such algorithms use statistics to detect recently used requests and then try keeping the most valuable requests in the cache (as LRU does). Meta-cache caching algorithms store meta-data to keep track of recent request history. There are different versions of LRU-based cache replacement algorithms, such as k-LRU virtual caches algorithm [3] and LRU(m) multi-level cache algorithm [2]. For example [11], [12], [13], [14], [15], and [16] describe other versions of LRU.

Dynamically adaptive caching algorithms are also known. In [7], a hybrid algorithm, Adaptive-LRU (A-LRU) divides the cache into several parts and uses meta-caches. Another dynamically adaptive caching algorithm is Adaptive Replacement Cache (ARC) [4], which balances between LRU and Least Frequently Used (LFU), to improve the combined result. However, these algorithms use a large amount of statistical data to manipulate between different parts of their algorithm and to adapt to changes in the requests' distribution.

The prior art algorithms described above are both space and time wasteful, as they require additional space for statistics (or meta-data) and are complex to implement.

It is therefore an object of the present invention to provide a method for performing adaptive cache management, based on smoothly manipulating LRU and CLIMB, without requiring statistics and additional data structures.

It is another object of the present invention to provide a method for performing adaptive cache management, that improves the Least Recently Used (LRU) policy performance in a fixed probability scenario, without maintaining statistics for each item.

It is a further object of the present invention to provide a method for performing adaptive cache management, that combine the advantages of LRU and CLIMB algorithms into a unified algorithm.

It is another object of the present invention to provide a method for performing adaptive cache management, with short stabilization time and high hit ratio.

Other objects and advantages of the invention will become apparent as the description proceeds.

SUMMARY OF THE INVENTION

A method for efficiently method for performing adaptive cache management, comprising the steps of:
a) providing a cache with predetermined size and number of cells having different locations with respect to the top or bottom of the cache, for storing at different cells, data items to be retrieved upon request from a processor;
b) receiving a stream of requests for items, each of which has a temporal probability to be requested; and
c) incrementing the jump size on cache misses and decrementing the jump size on cache hits by automatically choosing a smaller jump size and using a larger jump size when the probability of items to be requested is changed,
the jump size representing the number of cells by which a current request is promoted in the cache, on its way from the bottom, in case of a cache hit, or from the outside in case of a cache miss, towards the top cell of the cache.

In one aspect, a single variable is used for making decisions regarding incrementing the jump size on cache misses and decrementing the location of each items in cells of the cache.

Whenever the cache size dynamically increases or decreases over time, performing dynamic Adaptive CLIMB algorithm by setting the cache size dynamically, according to the requests stream.

The cache size may dynamically increase or decrease over time whenever the cache is shared by a plurality of processors.

In one aspect, a secondary virtual jump size may ne employed, the value of which is updated according to the cache hits in the top half or to any other fixed fraction of the cache.

Whenever the jump size is within a fixed fraction, the cache size is reduced.

In one aspect, the cache size may be doubled or halved.

The caching process may be modeled by a Markov Chain such that a state of the chain consists of the cache size being a vector of size K, indicating the content of each cache line, and the jump size is a number between 1 and K.

Dynamic adaptive cache management may be performed, by:
a) detecting an efficient cache size according to the requests stream;
b) reducing the cache size whenever the number of heavy hitters is significantly less than the cache size;
c) increasing the cache size whenever the current cache capacity is too small to contain all, or at least most of, the heavy hitters.

The adaptive cache management may be based on Adaptive CLIMB algorithm.

A multicore data processing system, which comprises:
a) a plurality of processors, connected to the cache, each of which sharing the cache memory with other processors;
b) a cache with predetermined size and number of cells having different locations with respect to the top or bottom of the cache, for storing data items to be retrieved upon request at different locations;
c) a centralized or distributed controller for controlling the operation of the cache, which is adapted to:
c.1) monitor a stream of requests for items reaching the processors, each item has an essentially temporal fixed probability to be requested;
c.2) increment the jump size on cache misses and decrementing the jump size on cache hits; and
c.3) automatically choose a smaller jump size, and use a larger jump size when the probability of items to be requested is changed,
the jump size representing the number of cells by which a current request is promoted in the cache, on its way from the bottom, in case of a cache hit, or from the outside in case of a cache miss, towards the top cell of the cache.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF PREFERRED EMBODIMENTS

Figure 1:
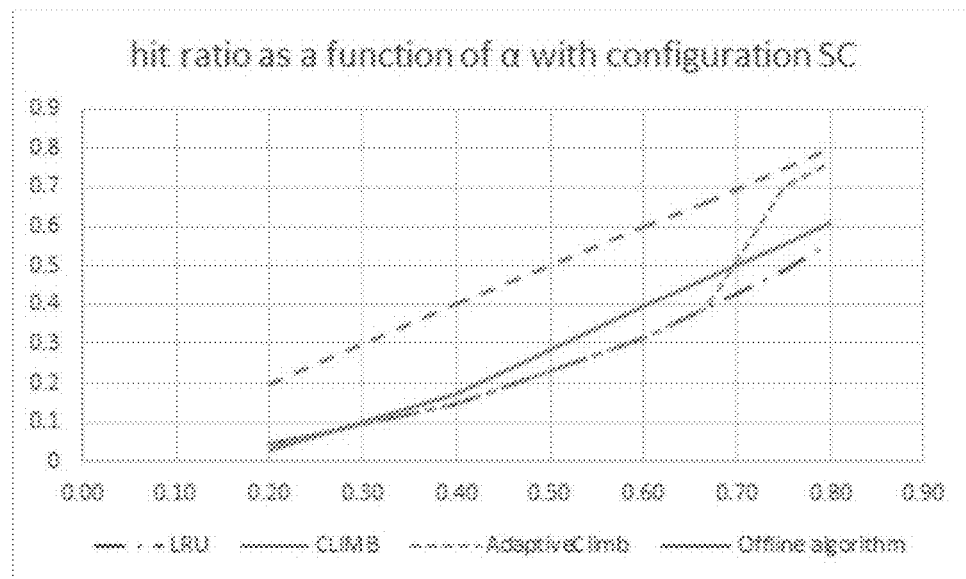
FIG. 1 illustrates We first checked the performance of AdaptiveClimb vs. LRU and CLIMB or various total weights of the heavy hitters.

The present invention proposes a method and system for performing adaptive cache management, based on existing cache management algorithms, LRU and CLIMB. The proposed cache management method combines the advantages of both LRU and CLIMB algorithms.

The proposed method stores a single value (the current jump), while preserving the fast adaptation of LRU probability changes. The proposed method (called Adaptive-Climb) also uses a modification of the Incremental Rank Progress (CLIMB) cache policy. Unlike CLIMB, the proposed AdaptiveClimb changes the number of position shifts after each request according to whether this request has been a hit or a miss. The performance of CLIMB is close to that of the optimal off-line algorithm, but its stabilization time is long. On the other hand, LRU is much more sensitive to changes, and thus its stabilization time is shorter, but it is sensitive to noise (i.e., the insertion of less frequent data items into the cache). Thus, AdaptiveClimb combines these two advantages to a single algorithm with both good performance and short stabilization time.

The present invention also proposes a dynamic version of AdaptiveClimb. This version (called Dynamic Adaptive-CLIMB), is designed for cases where the cache size can be dynamically changed. The adaptive algorithm is able to detect situations where the cache size is too small to yield a good hit ratio, as well as situations in which it is above what is required for a good hit ratio. In both cases, the dynamic version of AdaptiveClimb automatically changes the allocated cache size accordingly.

The AdaptiveClimb Algorithm

This algorithm makes small changes in the cache when the situation is stable, and large changes when it is not, using a jump size parameter. This parameter is the number of cells by which the current request is promoted in the cache, on its way from the bottom (or from the outside, in case of a cache miss) towards the top of the cache.

LRU and CLIMB may be viewed as two extremes regarding the jump size parameter. The jump size of LRU is K, which means a maximal change of the cache content due to each single request. Upon a cache hit, LRU promotes the current request by at most K cells up (towards the top of the cache), depending on its current position. In case of a miss, it jumps all the way from outside the cache to the top, and in case of a hit for the item at location i—it moves i−1 places to location 1. This is the factor that makes LRU sensitive to data changes and adapt to changes quickly, compared with CLIMB. The jump size of CLIMB is 1, which means a minimal change of the cache content due to any single request. This jump size of CLIMB allows diminishing the influence of noise, namely the insertion of less frequent data items into the cache.

Accordingly, a seldom requested item inserted in the cache, will most probably be removed from it before being requested again and promoted. CLIMB is better in gathering most frequently requested items in the cache during constant distribution periods. The proposed algorithm dynamically change the jump size so that it will fit both periods with frequent changes and periods with a constant distribution. The proposed algorithm achieves this goal by incrementing the jump size on cache misses and decrementing it on cache hits (the jump size represents the number of cells by which a current request is promoted in the cache, on its way from the bottom, in case of a cache hit, or from the outside in case of a cache miss, towards the top cell of said cache).

In contrast with other cache management algorithms, AdaptiveClimb spends but a single variable for making its decisions, rather than keeping a significant amount of statistics. As a result, all the cache space is available for running processes.

When there are many heavy hitters relatively to the cache size, there is no way indeed to achieve a high hit ratio. In these cases, when this is technically possible, the present invention proposes a dynamic version of AdaptiveClimb. Dynamic AdaptiveClimb's additional feature is to dynamically detect an efficient cache size according to the requests stream, in order to reduce the cache size when the number of heavy hitters is significantly less than the cache size, and increase the cache size when the current cache capacity is too small to contain all (or at least most) heavy hitters. The dynamic version of AdaptiveClimb uses one additional variable to achieve this goal. Similarly to LRU and CLIMB, AdaptiveClimb and its dynamic version are very simple and easy to implement.

System Model Settings

Assuming that there is a list $R=\{r_1, \ldots, r_N\}$ of N possible different requests where $p_1 \geq p_2 \geq \ldots \geq p_N$ are their (unknown) corresponding probabilities. The system contains a cache of size K and slow memory of size N−K. It is assumed that K<N. For each request r and cache configuration C, it is required to decide which configuration C' and jump size to move to, according to whether the request has been a hit or a miss and to the current jump size. Upon a cache miss, a cache management algorithm should decide whether to insert the new item to the cache, and if so—how to change the cache, and in particular which item to evict. Upon a cache hit, a cache management algorithm may decide to change the location of r (and necessarily of other items as well) in the cache.

AdaptiveClimb Algorithm

AdaptiveClimb uses a single variable, jump, to control its operation. This variable assumes values between 1 and K, and indicates by how much a requested item is promoted. The algorithm is presented in Algorithm 1.

---

Algorithm 1 ADAPTIVECLIMB (K)

```
 1:  jump ← K − 1
 2:  upon a cache hit on cache[i]
 3:      if jump > 1 then
 4:          jump − −
 5.      end if
 6:      if i > 1 and jump > 0 then
 7:          shift down the cache elements between cache(i − jump) and cache(i − 1)
 8:          cache[i − jump] ← cache[i]
 9:      end if
10:  end upon
11:  upon a cache miss on request j
12:      if jump < K − 1 then
13:          jump + +
14:      end if
```

<pre>
            Algorithm 1 ADAPTIVECLIMB (K)

15:      evict cache[K]
16:      if jump > 0 then
17:          shift down the cache elements between cache[K] and cache[K − jump + 1]
18:          cache[K − jump + 1] ← j
19:      end if
20:  end upon
</pre>

Dynamic AdaptiveClimb Algorithm

AdaptiveClimb is less effective when the total weight of the heavy hitters is small. For instance, when the total weight of the heavy hitters is less than ½, then the hit ratio is expected to be less than ½, which leads to jump value close to K.

Thus, in this case, AdaptiveClimb behaves as LRU. AdaptiveClimb is especially effective in the case where the cache size allows the inclusion of most heavy hitters in the requests stream. In this case, at the beginning, the value of jump is K, but there are enough cache hits to allow AdaptiveClimb to reduce jump to (about) 1 in a short time and reach stabilization. In this case, CLIMB-like behaviour is obtained.

The Dynamic AdaptiveClimb algorithm is applicable in situations where the cache size may dynamically increase or decrease over time. Its advantage over AdaptiveClimb is that it sets the cache size dynamically, according to the requests stream. The algorithm allows the jump size to grow above K. When it is too high, Dynamic AdaptiveClimb concludes that the cache is too small, and its size should be increased. Varying jump size is also used to reduce the cache size in case when it is larger than needed.

Such a dynamic cache size may be helpful in a multi-processing system, where the cache is a shared resource, or when a user pays a cloud provider for cache resources according to usage. To achieve this, Dynamic Adaptive-Climb lets jump decrease below 1. When jump size is 0, the algorithm employs a secondary virtual jump size denoted by jump', the value of which is updated according to the cache hits in the top half of the cache. When jump reaches −K/2, and the secondary virtual jump size reaches almost the same value up to some ε, the Dynamic AdaptiveClimb concludes that the top half of the cache contains most of the heavy hitters, and thus the cache size may be reduced. Thus, cache hits are counted both for the entire cache and for its top half. If both counters have roughly the same value, it is possible to conclude that most of cache hits come from the top half of the cache, and thus reducing the cache size would not have a significant impact on the cache performance. The algorithm is presented formally in Algorithm 2.

<pre>
            Algorithm 2 DYNAMIC ADAPTIVECLIMB (K, ε)

1:  jump ← K − 1
 2:  jump' ← 0
 3:  upon a cache hit on cache[i]
 4:      if jump > −K/2 then jump − − end if
 5:      if i ≤ K/2 then
 6:          if jump' > −K/2 then jump' − − end if
 7:      else
 8:          jump' + +
 9:      end if
10:      actualJump ← max{1, min{jump, i}}
11:      if i > 1 then
12:          shift down the elements between cache[i − actualJump] and cache[i − 1]
13:          cache[i − actualJump] ← cache[i]
14:      end if
15:  end upon
16:  upon a cache miss on request i
17:      jump + +; jump' + +
18:      evict cache[K]
19:      actualJump ← max{1, min{K − 1, jump}}
20:      shift down the elements between cache[K] and cache[K − actualJump + 1]
21:      cache[K − actualJump + 1] ← j
22:  end upon
23:  if jump == 0 then jump' ← 0 end if
24:  if jump == 2 · K then K ← K · 2 end if
25:  if jump == −K/2 && jump' == −K/2 · ε then K ← K/2 end if
</pre>

The algorithm allows major changes in the cache size—doubling it or halving it. Smaller changes (say, increasing by 25% and reducing by 20%) may be considered to obtain a size closer to the optimum.

Dynamically changing the cache size does not depend on the specific cache policy algorithm and therefore, dynamic cache size may be applied to any existing cache policy algorithm. For example, in order to add the option of dynamically changing cache size to LRU, it is possible to check if most of cache hits in the last time window (e.g., the last 100 requests) came from the top half of the cache and not from the bottom half. If it came from the top half of the cache, the cache size may be halved. If in the last time window LRU suffers from, say 80% of cache misses, then the cache size may be doubled. Dynamically changing cache size is relevant to other cache policies.

Modeling the Caching Process by a Markov Chain

A caching algorithm defines a Markov process over the occupancy states of the cache. ([10, 6] describe a brief basic overview on Markov chains.) At each time unit upon getting a request, the cache moves to another state, according to the algorithm used. A state of the chain consists of the cache and the jump size. The first of this is a vector of size K, indicating the content of each cache line, and the second is a number between 1 and K. The new state may differ from the old state in the order of the items in the cache, possibly in a newly inserted item at the instead of another item, and in the jump size, which may have been increased or decreased by 1. Hence, for a given request arrival process, a caching algorithm is equivalent to a state transition matrix over the cache states and jumps. The typical performance analysis approach is then to determine of the Markov process of states, and derive the average case hit ratio from that stationary distribution. In addition, important information is how fast the system adapts to changes in the requests' distribution.

Theoretically, it is possible to calculate the expected hit ratio for the proposed algorithms for any system settings. However, this calculation requires a huge matrix, and is thus impractical. For example, if N=100, and we start with K=10, even if we restrict the configuration to a single doubling and single halving with respect to the initial configuration, we get a possible cache size of 2K=20. Assuming that all heavy hitters have equal probabilities, and all tail requests also have equal probabilities, the number of possible cache configurations for this cache size is about 620,000 (while ignoring the possibilities with cache size 5 and 10). This number becomes even larger if we take into account the different possible values of jump and jump', for each possible cache configuration. Thus, an experimental analysis is much more feasible.

Experimental Results

The request sequences in all experiments were randomly generated according to given distributions. To obtain reliable results, very long request sequences have been used.

The following System Configuration (SC) has been used:

$$N=10^4, n=10^5, K=100 \qquad (1)$$

where N is the number of possible distinct requests, n is the length of the request sequences, and K is the initial cache size, allowed to grow up to 800 when using Dynamic AdaptiveClimb. (K is also allowed to decrease below 100, but this does not happen with the current choice of parameters.) There are two types of requests—heavy hitters and tail requests. All heavy hitters have the same (high) probability, and all tail requests also have the same (low) probability. The number of heavy hitters is equal to the initial cache size K.

If W denote the total weight (probability) of the heavy hitters, the probability of each heavy hitter is W/K, and that of each tail request is (1−W)/(N−K).

FIG. 1 illustrates We first checked the performance of AdaptiveClimb vs. LRU and CLIMB or various total weights of the heavy hitters. It can be seen that for small W, there are more misses than hits (even after the cache content stabilizes), so that the jump size stays all the time close to K. Thus, for small W, AdaptiveClimb functions almost exactly as LRU. For large enough W, the hit ratio increases with time and there are more hits than misses. At this point, the jump size starts decreasing, and it eventually becomes, and stays thereafter, very close to 1. Thus, for large W, AdaptiveClimb is effectively the same as CLIMB. The advantage of AdaptiveClimb with respect to CLIMB, seen in FIG. 1, is due only to the fact that CLIMB takes a very long time to stabilize. In the most-right part of the graph we may see that LRU over-performs CLIMB. The reason for this is since we start with random cache content, it takes some time for CLIMB to fill the cache with heavy hitters and evict all the junk. LRU and AdaptiveClimb do this faster.

It can be seen from FIG. 1 that there is an abrupt change in the performance of AdaptiveClimb for W between 0.7 and 0.71. The reason is that while, theoretically, jump may vary between 1 and K, it usually stabilizes very close to one of the two extreme values 1 and K. For W very close to 0.7, the value of jump may stabilize near K as well as near 1. The reason is that W is still not high enough to enforce jump to stabilize near 1. But there is a chance that there will be some long enough sub-sequence of requests that contains enough heavy hitters to influence jump to stabilize near 1.

Figure 2:
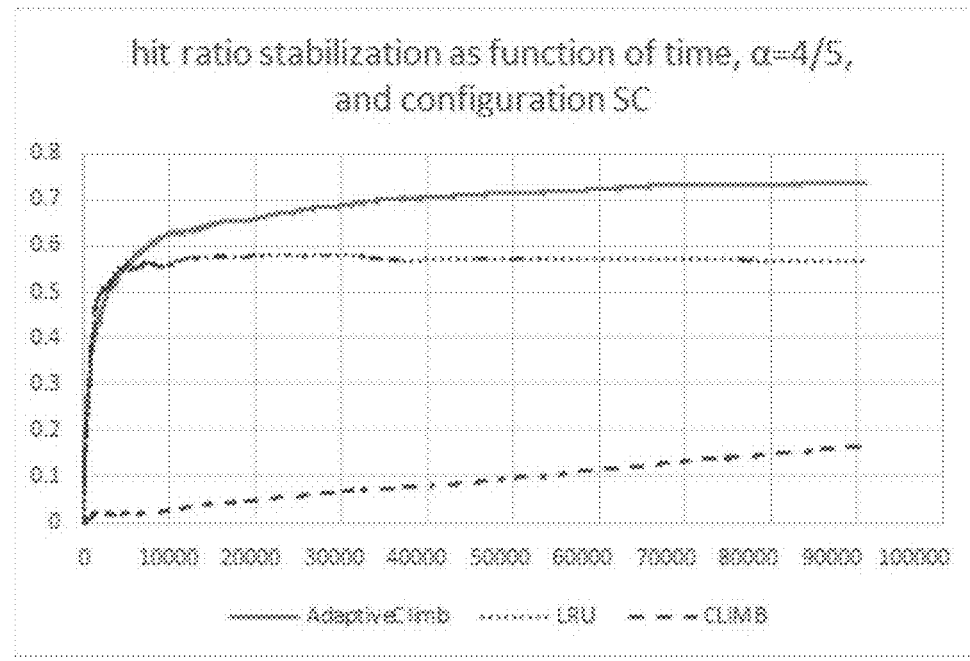
FIG. 2 shows AdaptiveClimb, LRU, and CLIMB hit ratio stabilization as function of time with $\alpha=4/5$.

FIG. 2 shows jump size stabilization for hit ratio values from 0.682 to 0.692, with step of 0.01, graph per each hit ratio value. It can be seen that the jump size stabilization behaves randomly—in four cases of nine the jump size is near K, and in the rest five cases the jump size is near 1. The reason for such a behaviour is that the total weight of the heavy hitters is not sufficient to define the stabilization unambiguously. However, below this range of W, Adaptive-Climb behaves almost as LRU, and above this range—in principle as CLIMB. Thus, in the latter region, Adaptive-Climb leads CLIMB for a long period of time, which CLIMB takes to stabilize. Later, though, CLIMB seems to be somewhat better, the reason being that jump increases from time to time above 1, which is not the right thing to do at this phase.

In all further experiments a value of W=0.8. has been used.

In case of starting from random cache content, although LRU achieves its stable hit ratio fast, the hit ratio of AdaptiveClimb that is achieved almost with the same speed, is much better. AdaptiveClimb outperforms LRU by a factor of 1.3, which is a significant improvement. When CLIMB reaches its stable hit ratio, CLIMB slightly outperforms AdaptiveClimb. This happens because CLIMB keeps jump to be 1 all the time, and AdaptiveClimb increases jump value for each miss. Since after stabilization most of the misses caused by tail requests, then increasing jump is unnecessary and might lead to some heavy hitters eviction. But stabilization time of CLIMB is much slower than of Adaptive-Climb, which leads to poor overall performance.

Figure 3:
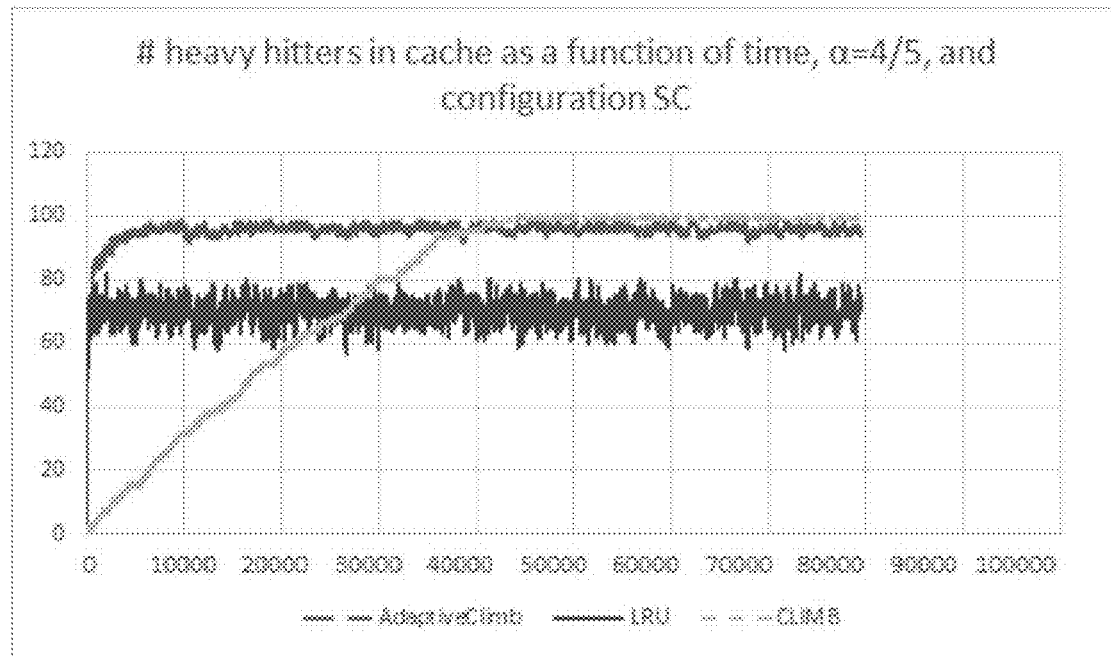
FIG. 3 shows a number of heavy hitters in the cache during the same cache policies as in FIG. 2.

FIG. 3 shows a number of heavy hitters in the cache during the same cache policies as in FIG. 2. The number of heavy hitters was measured after each 1000 requests. It can be seen that AdaptiveClimb easily attains almost the same number of heavy hitters in the cache as does CLIMB, but much faster. LRU, however, does not reach this number due to its sensitivity to noise.

Although LRU is considered an effective cache replacement algorithm, applications choose not to use it (and implement light versions of LRU, such as NRU) due to its difficult implementation. LRU requires lots of shift actions to place a request into its new position in the cache, which is costly. AdaptiveClimb, due to its varying jump size, does significantly less shifts during its stable periods, which is an additional advantage of this algorithm. In the worst case, each time 100 shifts must be done (as the size of the cache)—in total, $10^7$ shifts during the execution. In our experimental results, the number of shifts made by LRU is 7,001,769 which is 70% of the worst case. The number of shifts made by AdaptiveClimb is 168,660, which is 2% of the worst case. AdaptiveClimb result is 41 times better than LRU result. Also, larger cache should work better since it may keep more data, but on the other hand shifting on larger cache costs more. AdaptiveClimb make it possible to avoid this anomaly.

Figure 4:
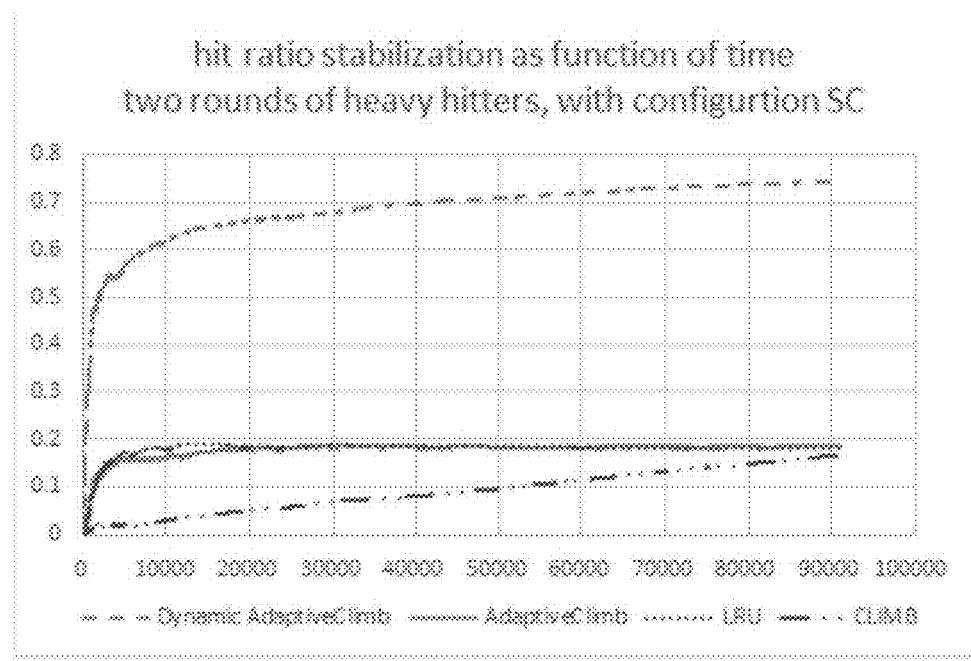
FIG. 4 depicts the speed of the cache size adaptation of Dynamic AdaptiveClimb as a function of the number of heavy hitters in the requests stream.

FIG. 4 depicts the speed of the cache size adaptation of Dynamic AdaptiveClimb as a function of the number of heavy hitters in the requests stream. Each algorithm was run in two rounds:

1. During the first 80% of the time, we have 100 heavy hitters.
2. During the last 20% of the time, we have 800 heavy hitters.

Figure 5:
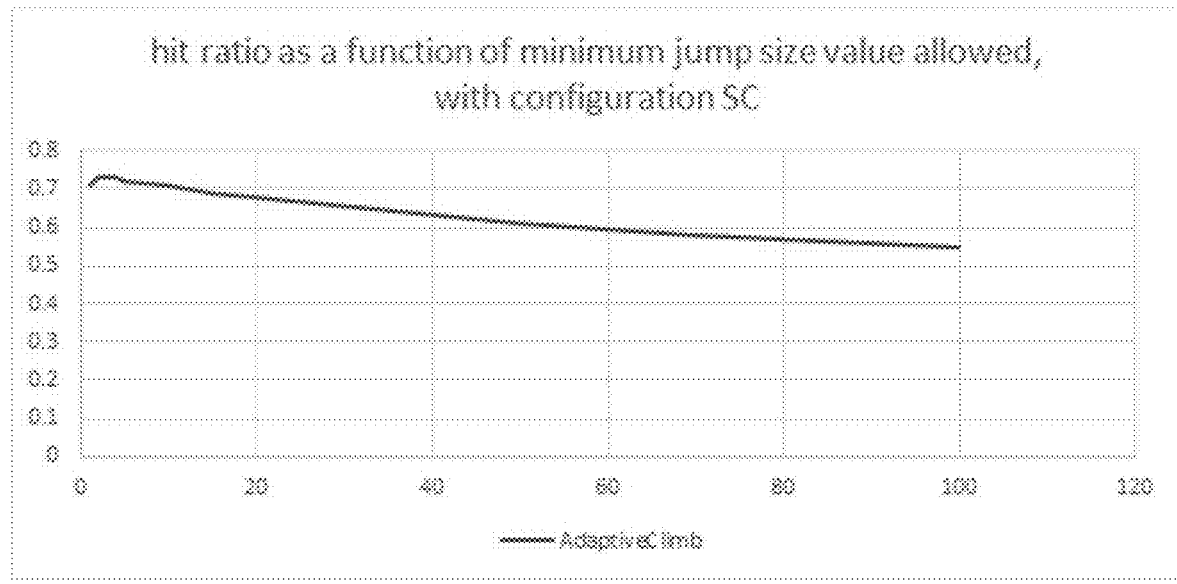
FIG. 5 shows the AdaptiveClimb's hit ratio as a function of the minimal allowed jump size value.

During the first execution round, one can observe from FIG. 5 that LRU and AdaptiveClimb reached almost the same hit ratio, CLIMB joined them after a long stabilization, and Dynamic AdaptiveClimb advantages do not help it during this round. After the second round starts, the difference in the performances of the policies changed dramatically. The experiment clearly shows that Dynamic AdaptiveClimb outperforms the other algorithms significantly. When the second round of the execution starts, Dynamic AdaptiveClimb efficiently fits the cache size to the changed number of heavy hitters. One can observe that Dynamic AdaptiveClimb quickly reached high hit ratio, while other cache policies could not adapt to the changes.

The identity of the heavy hitters during the second stage is determined randomly, independently of the first stage. Since LRU, CLIMB and AdaptiveClimb have a fixed size cache, in order to have a fair basis for comparison of these policies with Dynamic AdaptiveClimb, we calculated the average cache size during the execution of Dynamic AdaptiveClimb, and used this average cache size for LRU, CLIMB, and AdaptiveClimb throughout the both execution rounds.

Although in the above experiments used a minimum jump size value of 1 and maximum jump size K, these parameters may be tuned to achieve even better performance. On the one hand, t is desired to use low minimal jump size value in order to "lock" heavy hitters in the cache after they get there, and simulate CLIMB's behaviour. On the other hand, it is desired to increase the chance of a newly inserted request to stay in the cache, in order to overcome CLIMB's main drawback, namely that it inserts new items into the bottommost cache cell, and if this item does not repeat itself, some other new item will evict it. Thus, it is challenging for a newly arrived item to survive in the cache under CLIMB's policy, and a higher value of the minimal jump size increases this chance.

The following experiment has been performed to detect an optimal value of minimum jump. Each time the same SC as for the previous experiments has been used, and W=0.8. The values range of jump is 1, 2, 3, . . . , 100, and for every range value an appropriate hit ratio was measured.

FIG. 5 shows the AdaptiveClimb's hit ratio as a function of the minimal allowed jump size value. In this case, the most efficient jump minimum value is 3. This means that AdaptiveClimb may be even more efficient if its parameters are tuned carefully.

Figure 6:
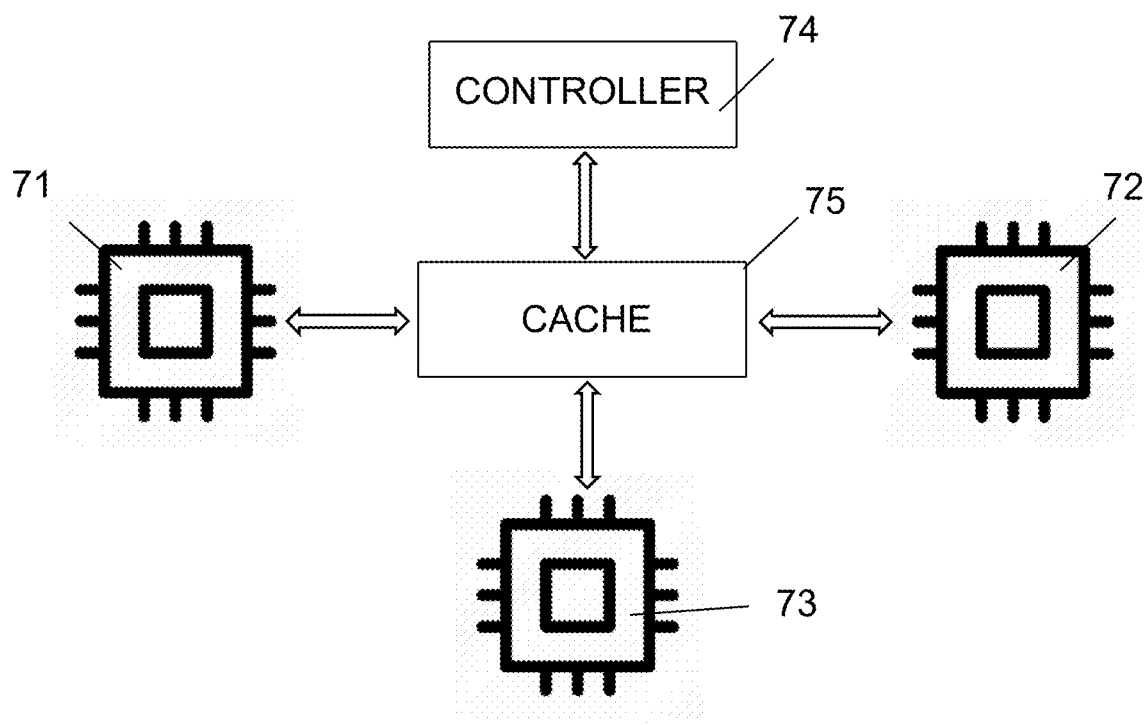
FIG. 6 is a block diagram of a multicore data processing system, which consists of several processors connected to a cache memory, where all processor share the cache.

FIG. 6 is a block diagram of a multicore data processing system, which consists of several processors 71-73, connected to a cache memory 74, where all processor share the cache. The cache has predetermined size and number of cells with different locations with respect to the top or bottom of the cache, for storing data items to be retrieved upon request at different locations. A centralized or distributed controller 75 controls the operation of the cache by monitoring a stream of requests for items reaching said processors, each item has an essentially temporal fixed probability to be requested. The controller 75 increments the jump size on cache misses and decrementing said jump size on cache hits. The controller automatically chooses a smaller jump size, and uses a larger jump size when the probability to be requested is changed.

The above examples and description have of course been provided only for the purpose of illustrations, and are not intended to limit the invention in any way. As will be appreciated by the skilled person, the invention can be carried out in a great variety of ways, employing more than one technique from those described above, all without exceeding the scope of the invention.

REFERENCES

[1] O. Aven, E. Coman Jr., and Y. Kogan, "Stochastic Analysis of Computer Storage, Series: Mathematics and its Applications", D. Reidel Publishing Company, 1987.

[2] N. Gast and B. Van Houdt, "Asymptotically Exact TTL-Approximations of the Cache Replacement Algorithms LRU(m) and h-LRU," in Proc. of ITC, 2016.

[3] V. Martina, M. Garetto, and E. Leonardi, "A Unified Approach to the Performance Analysis of Caching Systems," in Proc. of INFOCOM, 2014

[4] N. Megiddo and D. S. Modha, "ARC: A Self-Tuning, Low Overhead Replacement Cache." in Proc. of FAST, 2003.

[5] E. G. Coffman and P. J. Denning, "Operating Systems Theory", Prentice-Hall Englewood Cliffs, N J, 1973.

[6] 12. E. B. Dynkin, "Theory of Markov Processes", Pergamon, 1960.

[7] J. Li, S. Shakkottai, J. C. S. Lui, and V. Subramanian, "Accurate Learning or Fast Mixing? Dynamic Adaptability of Caching Algorithms," Arxiv preprint arXiv: 1701.02214, 2017.

[8] D. Starobinski and D. Tse, "Probabilistic Methods for Web Caching," Performance Evaluation, 2001, pp. 125-137.

[9] http://ita.ee.lbl.gov/html/contrib/EPA-HTTP.html

[10] H. M. Taylor and S. Karlin, "An Introduction to Stochastic Modeling", San Diego: Academic Press, 3rd ed., 1998.

[11] H. Dybdahl, P. Stenstrom, and L. Natvig. "An LRU-based Replacement Algorithm Augmented with Frequency of Access in Shared Chip-Multiprocessor Caches." In Proceedings of the 6th Workshop on Memory Performance: Dealing with Applications, Systems and Architecture (MEDEA 2006), 2006.

[12] A. Vakali, 2000. "LRU-based algorithms for Web cache replacement", In International Conference on Electronic Commerce and Web Technologies. Lecture Notes in Computer Science, vol. 1875. Springer-Verlag, Berlin, Germany, pp. 409-418.

[13] W. A. Wong and J.-L. Baer. "Modified LRU policies for improving second-level cache behavior", In HPCA-6, 2000.

[14] H. Ghasemzadeh, S. Mazrouee, and M. R. Kakoee. "Modified Pseudo LRU Replacement Algorithm", In Proc. of the Int. Symp. on Low Power Electronics and Design, pp. 27-30, Potsdam, Germany, March 2006.

[15] E. J. O'Neil, P. E. O'Neil, G. Weikum, "The LRU-k Page Replacement Algorithm for Database Disk Buering", Proc. ACM SIGMOD Conf., 1993, pp. 297-306.

[16] K. Cheng and Y. Kambayashi; "LRU-SP: a size-adjusted and popularity-aware LRU replacement algorithm for web caching", 24th Annual International Computer Software and Applications Conference, COMPSAC 2000, pp. 48-53.

The invention claimed is:

1. A method for efficiently method for performing adaptive cache management, comprising:
   a) providing a cache with predetermined size and number of cells having different locations with respect to the top or bottom of said cache, for storing at different cells, data items to be retrieved upon request from a processor;
   b) receiving a stream of requests for items, each of which has a temporal probability to be requested; and
   c) incrementing the jump size on cache misses and decrementing said jump size on cache hits by automatically choosing a smaller jump size and using a larger jump size when the probability of items to be requested is changed,
   said jump size representing the number of cells by which a current request is promoted in the cache, on its way from the bottom, in case of a cache hit, or from the outside in case of a cache miss, towards the top cell of said cache.

2. A method according to claim 1, wherein a single variable is used for making decisions regarding incrementing the jump size on cache misses and decrementing the location of each items in cells of the cache.

3. A method according to claim 1, whenever the cache size dynamically increases or decreases over time, performing dynamic Adaptive CLIMB algorithm by setting the cache size dynamically, according to the requests stream.

4. A method according to claim 3, wherein the cache size dynamically increases or decreases over time whenever the cache is shared by a plurality of processors.

5. A method according to claim 3, employing a secondary virtual jump size, the value of which is updated according to the cache hits in the top half or to any other fixed fraction of the cache.

6. A method according to claim 3, wherein whenever the jump size is within a fixed fraction, the cache size is reduced.

7. A method according to claim 3, wherein the cache size is doubled or halved.

8. A method according to claim 3, wherein the caching process is modeled by a Markov Chain such that a state of the chain consists of the cache size being a vector of size K, indicating the content of each cache line, and the jump size is a number between 1 and K.

9. A method according to claim 1, further comprising performing dynamic adaptive cache management, by:
   a) detecting an efficient cache size according to the requests stream;
   b) reducing the cache size whenever the number of heavy hitters is significantly less than the cache size;
   c) increasing the cache size whenever the current cache capacity is too small to contain all, or at least most of, the heavy hitters.

10. A method according to claim 1, wherein the adaptive cache management is based on Adaptive CLIMB algorithm.

11. A multicore data processing system, comprising:
   a) a plurality of processors, connected to said cache, each of which sharing said cache memory with other processors;
   b) a cache with predetermined size and number of cells having different locations with respect to the top or bottom of said cache, for storing data items to be retrieved upon request at different locations;
   c) a controller for controlling the operation of said cache, which is adapted to:
      c.1) monitor a stream of requests for items reaching said processors, each item has an essentially temporal fixed probability to be requested;
      c.2) increment the jump size on cache misses and decrementing said jump size on cache hits; and
      c.3) automatically choose a smaller jump size, and use a larger jump size when the probability of items to be requested is changed,
   said jump size representing the number of cells by which a current request is promoted in the cache, on its way from the bottom, in case of a cache hit, or from the outside in case of a cache miss, towards the top cell of said cache.

12. A multicore data processing system according to claim 11, in which the controller is centralized or distributed.

* * * * *